May 19, 1970

A. M. NELSON 3,513,457

MAGNETO-OPTICAL TRANSDUCING SYSTEM

Filed Dec. 12, 1962

INVENTOR:
Alfred M. Nelson

By Smyth, Roston & Pavitt
Attorneys

INVENTOR:
Alfred M. Nelson

Attorneys

INVENTOR:
Alfred M. Nelson

Attorneys 3,513,457
MAGNETO-OPTICAL TRANSDUCING SYSTEM
Alfred M. Nelson, Redondo Beach, Calif., assignor to The Magnavox Company, Torrance, Calif., a corporation of Delaware
Filed Dec. 12, 1962, Ser. No. 244,170
Int. Cl. G11b 11/10, 7/06
U.S. Cl. 340—174.1
26 Claims

ABSTRACT OF THE DISCLOSURE

A magneto-optic readout system which uses a transparent substrate to support a thin film magnetic enhancement layer and biasing techniques.

---

This invention relates to a magneto-optic reproducing system. It has been proposed to reproduce information recorded on a magnetic medium by the use of an indirect Kerr magneto-optic effect. The reproduction is accomplished by the use of a thin magnetic film having a low coercivity deposited on a transparent substrate. The magnetized medium is brought into proximity to the thin film to allow the external magnetic fields from the medium to induce flux into the thin film in accordance with external magnetic fields. In one form of the invention polarized light is directed through the transparent substrate to the face of the thin film. The light experiences a rotation in its plane of polarization if the plane of incidence of the light is parallel to the magnetic field with the magnitude of the rotation in accordance with the magnetization of the thin film. The rotation may be detected with suitable optical elements and electro-optic transducers so as to produce an output signal in representation of the information on the magnetic medium.

In another form of the invention unpolarized light is directed through the transparent substrate to the face of the thin film. Due to the transverse Kerr effect, the intensity of the light is varied in accordance with the magnetization of the thin film. The variable intensity light may be detected by suitable transducers to produce an output signal in representation of the information on the magnetic medium.

The principal advantage in the optical detection of magnetic recording is the capability of reading information recorded at much higher storage densities and with a wider frequency range than is possible with conventional magnetic reproduction. Also, the use of optical detection reduces the wear which is inherent in conventional magnetic reproduction. Further, the indirect magneto-optic technique offers advantages over a direct optical detection since the indirect method allows the use of a wide range of recording materials notwithstanding the optical properties of the recording materials.

Also, the reproducing surface in the indirect method may have a very small size. Since the reproducing surface should have very closely controlled optical properties, a small reproducing surface is essential in minimizing costs in the system. Finally, the indirect method reduces extraneous optical interference since the reading or reproducing surface is maintained constant at the face of the thin film.

A fuller explanation of the indirect reproduction technique will be found with reference to the following co-pending applications. Application Ser. No. 88,833 filed Feb. 13, 1961, by Alfred M. Nelson and entitled Transducing Apparatus and Method; application Ser. No. 124,676 filed July 17, 1961, by Alfred M. Nelson and entitled Magneto-Optical Transducer; application Ser. No. 145,212 filed Oct. 16, 1961, now abandoned, by Henry W. Griffiths and entitled Magneto-Optical Transducer, and application Ser. No. 165,202 filed Jan. 9, 1962, now U.S. Pat. No. 3,196,206, by Henry W. Griffiths and entitled Magneto-Optical Transducer. All of the above applications are assigned to the same assignee as this case.

The invention of the present application is directed to improvements over the reproduction techniques disclosed in the above-mentioned copending applications. The present application contemplates the use of area scan techniques which allow a greater freedom in the reproduction of the magnetic information since an all-electronic scanning system is used.

For example, the reproducing system of the present invention may have the magnetic medium moved relative to the thin film with light directed toward the thin film over a substantial area. The light is reflected from the thin film to an electronic scanning device, for example, a vidicon or image-dissector type of television camera. The information may be recorded as a plurality of adjacent tracks within the given area with each area constituting a frame of information. The electronic scanning device detects the frame of information by scanning along the adjacent tracks in a particular period of time.

The medium, for example a tape, may be moved continuously and the light source may be modulated so that each frame of information is presented for the particular period of time to the electronic scanning device. An alternative arrangement would be to have the light source operate continuously and the magnetic tape moved discontinuously. A third method of reading the information might be to have a continuous light source and a continuous movement of the tape with a rotating mirror placed in the path of the light source so as to present successive lines or tracks of information to the electronic scanning device.

The invention of the present application also contemplates a method of recording the information which is advantageous when using a reproducing system of the type described above. For example, the information may be recorded as a phase modulated digital signal. The information signal includes a keying signal at the start of each adjacent track to allow the passage of information for a length of time equal to the scan time for each adjacent track. This may be accomplished by using logical circuitry such as "AND" gates and multivibrators which are sensitive to the keying signal. The invention also contemplates techniques of controlling the electronic scanning device to accurately track the adjacent tracks in turn to faithfully reproduce the information.

As a further embodiment of the invention, the reproduction of the information is improved by using biasing techniques. The biasing may be used whether the information has been recorded in a digital fashion as described above, or whether the information has been recorded as an analog signal. For example, if the information has been recorded on an analog basis to include both frequency and amplitude information, the biasing signal may be superimposed on the information signal during reproduction. The biasing signal may have a frequency which is substantially higher than the highest frequency content in the information. The high frequency biasing signal is used when the electronic scanning device has an instantaneous characteristic, for example, when the electronic scanning device is an image dissector. The information is reconstructed by integrating the output signal from the image dissector.

When the scanning device has storage characteristics, such as a vidicon, the bias frequency may be much lower. For example, the bias frequency need only be some multiple of the rate at which the information is being presented to the electronic scanning device. The use of a vidicon or storage type of scanning device also is advantageous in that the information is automatically integrated by the vidicon to directly reproduce the information as recorded on the medium.

The bias signal may be superimposed on the information signal by passing the medium through the center of a toroidal coil. Another method of superimposing the biasing signal would be by the use of a conductor located adjacent to, but insulated from, the thin film.

A clearer understanding of the invention will become apparent with reference to the following figures, wherein.

Figure 1:
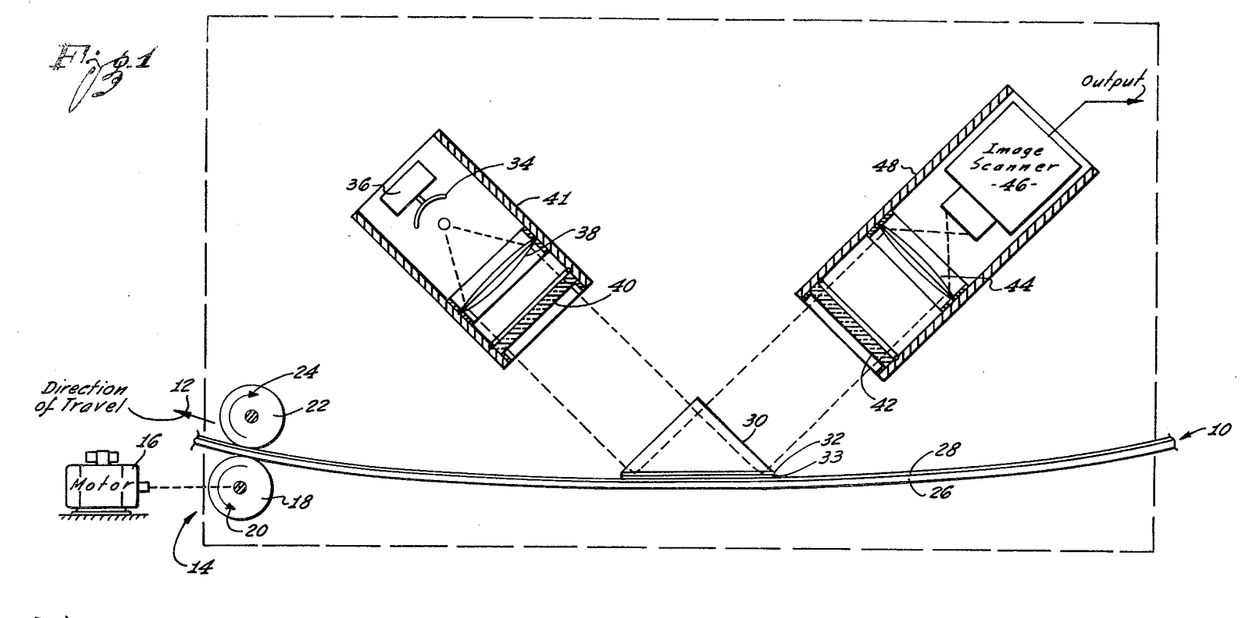
FIG. 1 is a block diagram of an area scan reproducing system.

In FIG. 1 a tape 10 is moved in a longitudinal direction as shown by the arrow 12. The longitudinal movement of the tape is accomplished by a conventional tape transport generally designated as 14. The tape transport includes a motor 16 which drives a capstan wheel 18 in a direction indicated by the arrow 20. An idler wheel 22 rotates in a direction indicated by the arrow 24 when the tape is forced against the idler wheel by the capstan and the combination of the capstan and idler wheel produces the longitudinal movement of the tape 10.

The tape 10 includes a base member 26 composed of an inert backing material, for example, acetate or "Mylar." Disposed on the base member 26 is a layer of magnetic material 28, for example, iron oxide. The tape 10 is moved relative to a prism 30. The prism 30 has a thin film 32 of low coercivity magnetic material disposed on one surface. A layer 33 having a low coefficient of friction covers the thin film 32 so as to provide an essentially frictionless surface for the tape 10 to ride upon.

A light source 34 is disposed relative to the prism 30 to direct light toward the prism 30. The light source is controlled by a modulator 36 to flash on and off in accordance with the frequency of the modulator. The light passes through a collimating lens 38 which modifies the light into a plurality of parallel rays. The parallel rays of light pass through the polarizer 40 so that all the light has the same plane of polarization. All of the above elements may be included within a housing generally designated as 41. The polarized light strikes the back surface of the thin film 32 and is reflected toward an analyzer 42. The light passes through the analyzer 42 and is focused by a lens 44 at the input surface to an electronic image scanning device 46 which, for example, may be a television camera. The above elements may be included within an outer casing 48.

The magnetic information on the recording surface 28 of the tape 10 induces magnetic flux into the thin film to produce a magnetization of the thin film in accordance with the information. Various points on the thin film, therefore, have different characteristics depending upon the information on the tape 10. The light when striking the back surface of the thin film at the various points is rotated in accordance with the Kerr magneto-optical effect. This light is then reflected toward the analyzer 42 which passes light having a particular polarization. The light passing from the analyzer 42 has various characteristics at the different points dependent upon the rotation produced at the back face of the thin film 32. It will be appreciated that the reproducing system illustrated in FIG. 1 relates to the reproduction of the information in accordance with the rotation of the light. However, in using the transverse Kerr effect for reproduction of the information the polarizer 40 and the analyzer 42 may be eliminated.

The electronic scanning device 46 detects the various values of the light by scanning the light sensitive surface in successive tracks. The output signal from the electronic scanning device, therefore, has characteristics in accordance with the information recorded on the magnetic tape 10.

Figure 2:
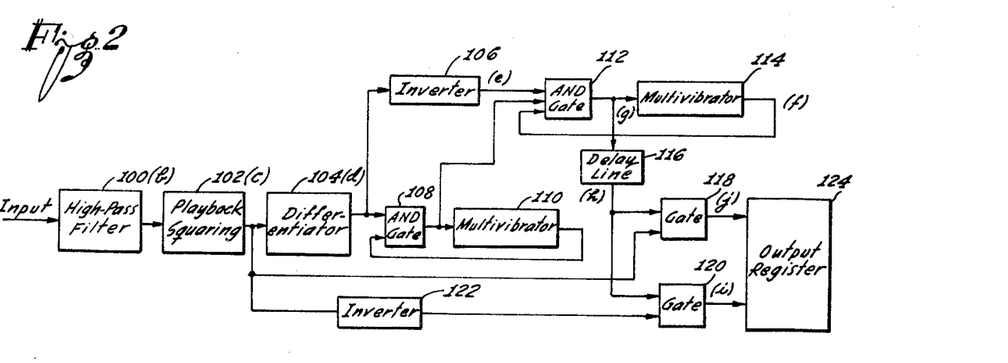
FIG. 2 is a block diagram of circuitry used to reproduce information recorded as a phase-modulated digital signal.
Figure 3:
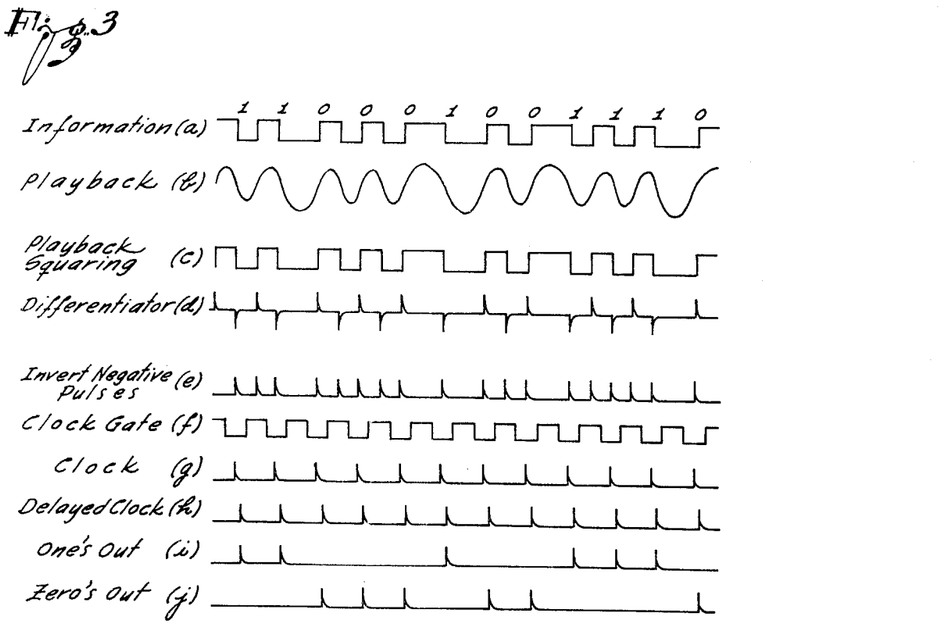
FIG. 3 is a series of curves designated (a) to (j) used in explaining the operation of FIG. 2.

FIG. 2 shows a block diagram of a system for reproducing information detected by the system shown in FIG. 1 when the information is recorded as a phase modulated digital signal. FIG. 3 includes a series of curves explaining the operation of FIG. 2. The information is initially recorded as a series of adjacent tracks in a transverse direction across the tape 10. The information signal has an appearance as shown in curve (a) of FIG. 3. As can be seen, the information signal is divided into a plurality of time periods. The information in contained as changes in the phase of the signal in the middle of each period. When the phase change is from a positive to a negative value, the information may, for example, represent the digital value of 1. This is shown in curve (a) during the first two periods of the information. When the phase change is from a negative to a positive value, the information may have a digital representation of zero. This, for example, is shown in the third, fourth and fifth periods of curve (a).

The information is recorded on the magnetic medium and during recording and reproduction the information experiences a partial degradation of the signal. This degradation results from the limited high frequency response of the recording and reproduction system. The playback signal is as shown in curve (b) of FIG. 3. It will be noted that the playback signal has phase changes corresponding to the phase changes of the information signal, but the playback signal has rounded portions as opposed to the sharp changes in the information signal. The signal as shown in curve (b) would appear at point (b) illustrated in FIG. 2. The input signal as detected by the reproducing system of FIG. 1 is fed into a high-pass filter 100 so as to eliminate any low frequency and DC variations in the level of the signal. The signal then passes into a playback squaring circuit 102 to produce an output signal corresponding to the original information signal. This output signal may be seen with reference to curve (c) of FIG. 3 and the signal appears at point (c) in FIG. 2.

The output signal from the playback squaring circuit 102 is applied to a differentiator 104. The differentiator produces a signal as shown in curve (d) of FIG. 3 and this signal appears at a point marked (d) in FIG. 2. As will be noted, the differentiated signal is a plurality of pulses with the pulses having a positive polarization when the square wave signal changes from a lower to a higher value and having a negative polarization when the square wave changes from a higher to a lower value. The differentiated signal has a pulse appearing in the middle of each period since the information has a phase change in the middle of each period. However, the differentiated signal may or may not have a pulse appearing at the beginning of each period.

The differentiated signal is then applied to an inverter 106 to produce a signal as shown in curve (e) of FIG. 3, which signal appears at a point designated by an (e) in FIG. 2. The inverter is designed to invert only the negative pulse so as to produce an output signal having pulses all of the same polarity. The signal from the differentiator is also applied to an "AND" gate 108. The "AND" gate normally operates to conduct the differentiated signal upon the absence of a second input signal to the "AND" gate 108. The "AND" gate 108 feeds into a multivibrator 110 and the combination of the "AND" gate 108 and the multivibrator 110 initiates the operation of the reproduction system at the start of the scan of each adjacent track.

This initiation may be accomplished by the use of a keying signal. For example, the first period of each information signal may represent a digital 1 as a keying signal. When the keying signal is applied to the "AND" gate 108, it is passed to the multivibrator 110. The multivibrator is a one-shot multivibrator and is designed to produce its output upon the appearance of the keying signal. The output from the multivibrator 110 is then fed back to the "AND" gate 108 to inhibit the passage of any further signals through the "AND" gate 108 for a period of time corresponding to the period that the multivibrator conducts. For example, the period of time may be approximately the length of time it takes for the electronic scanning device 46 illustrated in FIG. 1 to scan a single track located transversely across the tape 10. An output from the combination of the "AND" gate 108 and the multivibrator 110 is taken at a point located between these two elements and this output is applied to a second "AND" gate 112. Before the appearance of the keying signal, this output from the "AND" gate 108 and multivibrator 110 inhibits the passage of signals through the "AND" gate 112.

Also applied to the "AND" gate 112 is the output from the inverter 106. The "AND" gate 112 is coupled to a multivibrator 114. The "AND" gate 112 and multivibrator 114 have a similar arrangement to the "AND" gate 108 and multivibrator 110. That is, the multivibrator is a one-shot multivibrator and has its output coupled in a feedback arrangement to the input of the "AND" gate 112. The "AND" gate 112 normally is inhibited during the presence of a signal from the "AND" gate 108. However, after the appearance of the keying signal, the signal from the "AND" gate 108 disappears and the "AND" gate 112 conducts. The "AND" gate 112, therefore, passes the signal during the second period and every succeeding period of the information signal.

The multivibrator 114 then produces an output signal as shown by curve (f) of FIG. 3. This signal appears at point (f) in FIG. 2. The output signal from the multivibrator inhibits the passages of signals through the "AND" gate 112 during the period of time that the multivibrator conducts. This period of time overlaps the start of each succeeding period in the information signal. Therefore, the output from the "AND" gate 112 appears as shown by curve (g) in FIG. 3 and occurs at a point (g) in FIG. 2. It will be noted that the curve (g) has a pulse appearing in the middle of each period of the information signal. This pulse is used as a clock to gate the output information in synchronism with the original signal recorded on the tape 10.

The clock is first delayed by a delay line 116 an appropriate length of time so that the clock signal appears in the second half of each period of the information signal. The delay clock is shown in curve (h) in FIG. 3 and appears at a point (h) illustrated in FIG. 2. The clock is applied to a pair of gates 118 and 120. The gate 118 is used to detect the presence of zeros in the information signal and the gate 120 is used to detect the appearance of ones in the information signal. The square information signal coming from the squaring circuit 102 is applied from point (c) to the gate 118 and is applied through an inverter 122 to gate 120.

It will be noted with reference to curve (j) shown in FIG. 3 that a pulse appears at the output of the gate 118 when the signal appearing at point (c) is at a positive value. The delay clock pulse applied to the gate 118 then passes directly through the gate to an output register 124. The gate 120 operates on a positive signal at point (c) in the same fashion as the gate 118 due to the use of the inverter 122 and these may therefore have similar circuitry.

Figure 4:
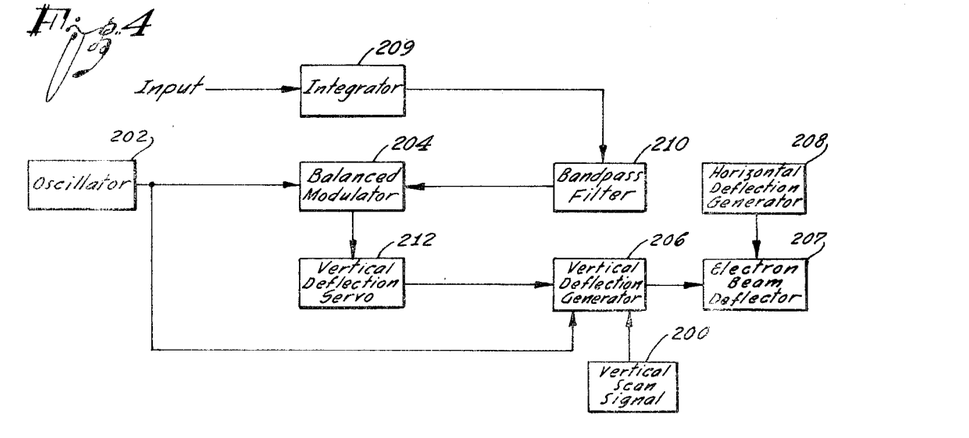
FIG. 4 is a block diagram of a control system used in regulating the tracking of the system of FIG. 1.

FIG. 4 shows a system for controlling the tracking of the electronic scanning device in FIG. 1. The information is recorded as a plurality of adjacent tracks located transversely across the tape 10. The electronic scanning device, therefore, must scan a track and then retrace back to start the scan of the adjacent track. This type of scanning is conventional and is accomplished by horizontal and vertical control of an electron beam. The normal vertical scanning is provided by circuitry 200 in FIG. 4. In order to have a proper tracking of the electron beam across each adjacent track, an oscillator 202 is coupled to a balanced modulator 204.

The output from the oscillator 202 is also applied to vertical deflection generator 206. The normal vertical scan signal 200 is also coupled to the deflection generator 206. The deflection generator 206 controls the vertical deflection in the electron beam deflector 207 which may be electrostatic plates or electro-magnetic coils. The horizontal deflection of the electron beam deflector 207 is controlled by a horizontal deflection generator 208. The input signal as shown in curve (b) in FIG. 3 is also applied to an integrator 209. The output from the integrator is coupled through a bandpass filter 210 to the balanced modulator 204. The output from the balanced modulator 204 is applied to a deflection servo 212. The deflection servo 212 produces an error signal which is coupled to the deflection generator 206.

Figure 5:
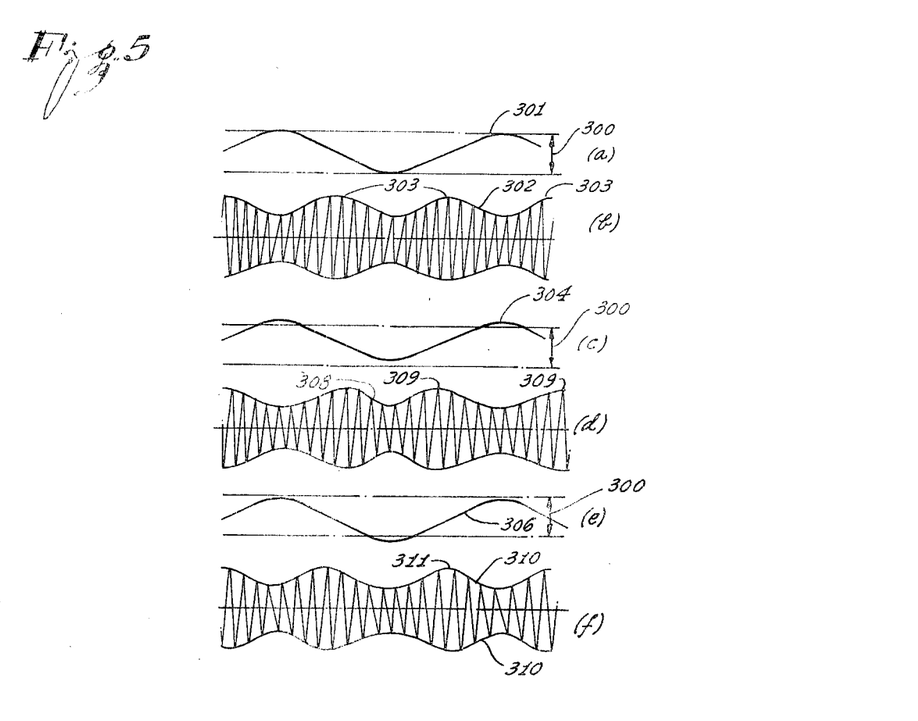
FIG. 5 is a series of curves designated (a) to (f) used in explaining the operation of the control system of FIG. 4.

The operation of the system of FIG. 4 may be seen with reference to curves (a) through (f) of FIG. 5, In curve (a) a track on a tape is designated by the distance shown by the arrow 300. The oscillator 202 coupled through the deflection generator 206 controls the electron beam to scan across the track in a path shown by the line 301. It will be noted that the beam scans across the track in a sinusoidal fashion with a frequency equal to the frequency of the oscillator 202. This produces an input signal which has an envelope 302 as shown in curve (b) since the response from the reproducing system has an amplitude dependent upon the position of the electron beam relative to the center of the track. The envelope signal has maximum values as points 303. The integrator 209 and the bandpass filter 210 eliminate all frequencies other than the frequency of the envelope. The envelope signal is then applied to the modulator and compared with the signal from the oscillator 202. If the electron beam is tracking properly, the two input signals to the balanced modulator are balanced with respect to each other over one complete cycle and the net output from the balanced modulator is zero.

When the electron beam is not properly tracking the information on the tape, the path of the beam may be displaced to either one side or another of the track as shown in curves (c) and (e). For example, as shown in curve (c) a path 304 may be displaced upwardly from the track on the tape, and in curve (e) a path 306 may be displaced downwardly from the track on the tape. When the path is displaced upwardly, a signal 308 as shown in curve (d) is applied to the balanced modulator from the bandpass filter 210. When the track is displaced downwardly a signal 310 as shown in curve (f) is produced.

It will be noted that the signals 308 and 310 are distorted when compared with the signal 306. For example, the signal 308 has its maximum values appearing at points 309. These points are shifted when compared with the points of maximum value 303 of signal 302. In a like fashion the signal 310 has points of maximum value 311 in a shifted position when compared with points 303. Both signals 308 and 310 are, preferably unbalanced and when applied to the balanced modulator 204 produce an output signal from the balanced modulator in proportion to the amount of unbalance.

It will also be noted that the unbalance in the two signals 308 and 310 are in opposite directions and the polarity of the output signal produced by the balanced modulator 204 is dependent upon the difference in unbalance to distinguish between errors in tracking upwardly or downwardly. The vertical deflection servo 212 therefore produces an error signal in accordance with the magnitude and direction of the tracking error.

Figures 6, 6A, 7:
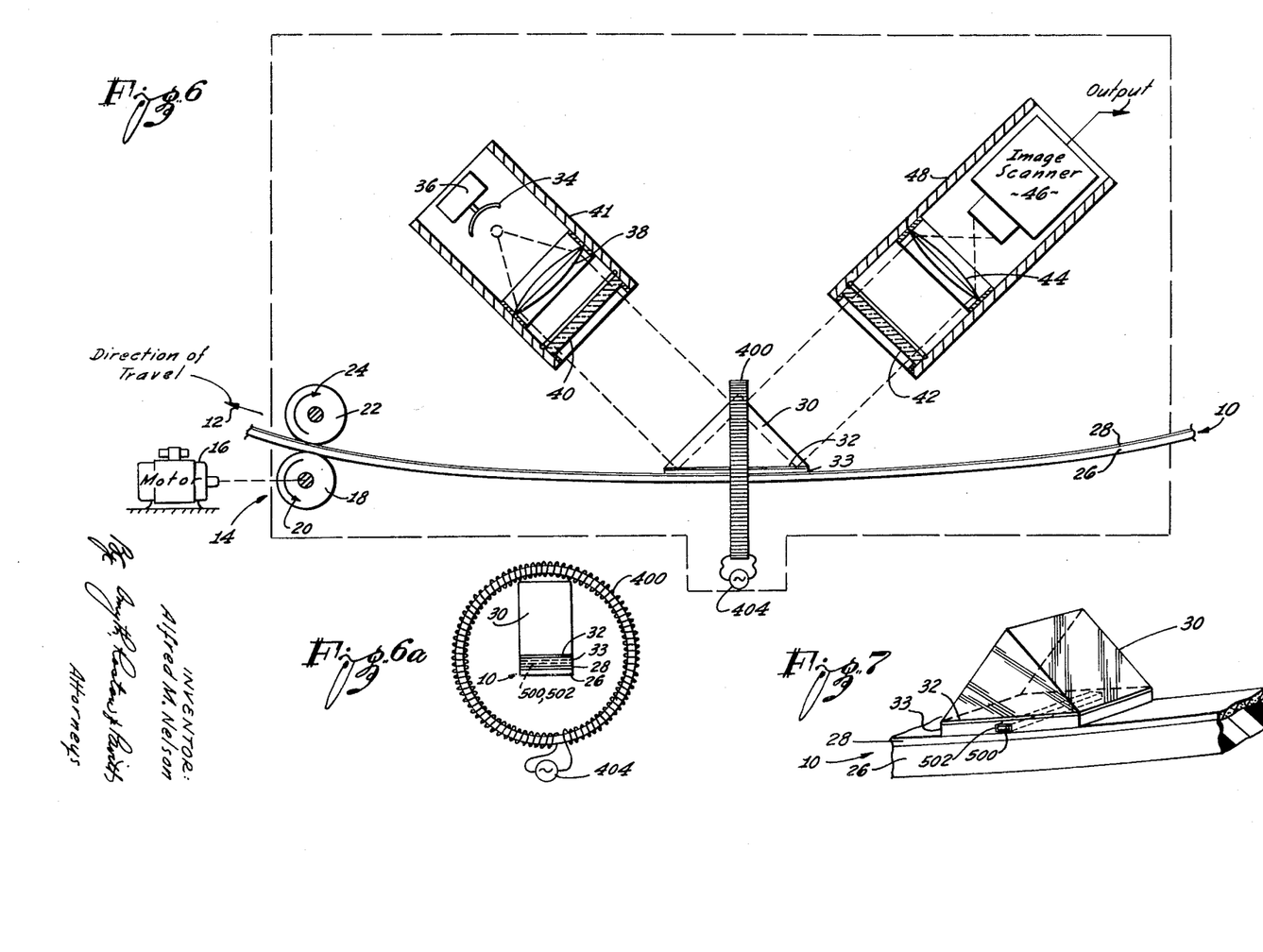
FIG. 6 is a block diagram of a reproducing system similar to FIG. 1 but additionally including biasing means.
FIG. 6a is a portion of the system of FIG. 6 showing the interrelationship of the biasing means and the medium.
FIG. 7 illustrates an alternative method of including the biasing signal within the reproducing system of FIG. 6.

FIG. 6 is a reproducing system similar to the system shown in FIG. 1 but additionally including a biasing signal. Elements having similar functions to those shown in FIG. 1 are given the same reference numeral. As in FIG. 1, a tape 10 composed of a base 26 and an iron oxide coating 28 is moved in a longitudinal direction as indicated by the arrow 12. This movement is provided by a tape transport generally designated as 14. The tape transport 14 includes a motor 16 driving a capstan wheel 18 in a direction indicated by the arrow 20. An idler wheel 22 presses against the tape 10 and moves in a direction indicated by the arrow 24. During the movement of the tape 10 a light source 34 directs light through a lens system 38 and the light is modified by a polarizer 40 in the same manner as explained in reference to FIG. 1. A modulator 36 controls the operation of the light source in a predetermined manner so that the light is produced at successive periods of time.

The light passes through the prism 30 which includes a thin film of magnetic material 12 deposited on one surface of the prism 30. A coating 33 is provided so that the tape 10 moves against a surface which has a low coefficient of friction. The light is reflected from the back surface on the thin film 32 and is directed through an analyzer 42 to be focused by a lens 44 on the face of the electronic scanning device 46 such as a television camera. The above elements are housed in casings 41 and 48 which may be designed to be impervious to light so as to eliminate disturbances caused by light outside of the reproducing system.

FIG. 6 additionally includes means for biasing the information during reproduction. The biasing means may consist of a toroidal coil 400 and a signal generator 404. FIG. 6a illustrates more clearly the relative placement of the biasing coil 400 and the tape 10. It will be seen that as the tape moves the signal generator 404 and the coil 400 produce a magnetic field superimposed on the information and parallel to the direction of travel of the tape 10.

FIG. 7 illustrates a second means for supplying the biasing signal to the reproducing system. The tape 10 includes the base 26 coated by the iron oxide material 28. The prism 30 has the thin film 32 of magnetic material deposited on one surface. The biasing signal is supplied by a conductor 500 which may be embedded in the coating 33 which has the low coefficient of friction. Since the coating 33 may have conductive properties, insulating material 502 is provided to cover the conductor 500. The biasing of the information is provided by supplying a biasing signal across the ends of the conductor 500.

Figure 8:
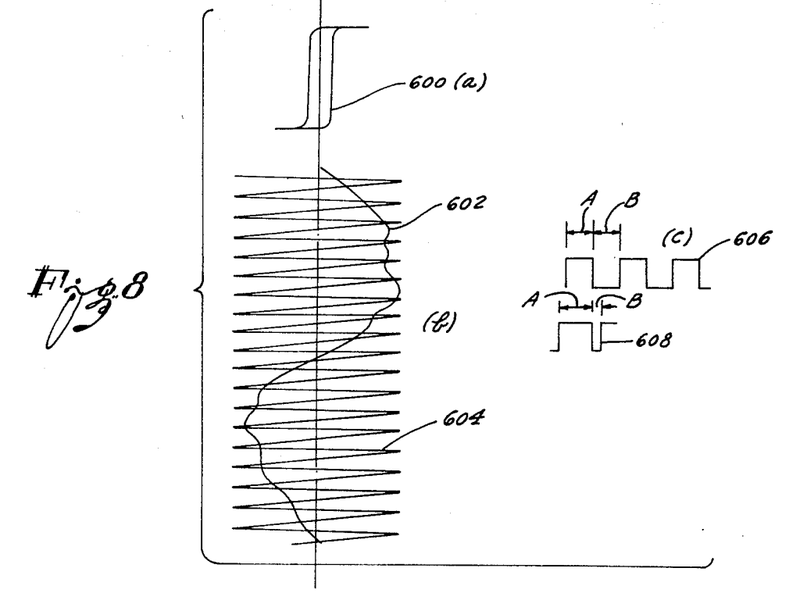
FIG. 8 is a plurality of diagrams designated (a) to (c) used in explaining the operation of the reproducing system including a first type of biasing signal.
Figure 9:
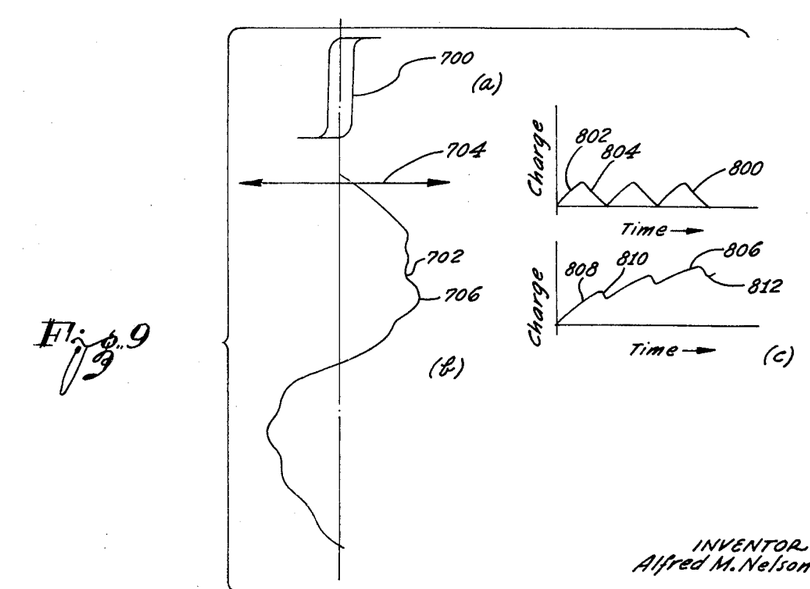
FIG. 9 is a plurality of diagrams designated (a) to (c) used in explaining the operation of the reproducing system including a second type of biasing signal.

FIGS. 8 and 9 illustrate curves explaining the operation of the biasing signal in the reproducing system for two possible record situations. In diagram (a) of FIG. 8 a hysteresis loop 600 is illustrative of the characteristics of the thin film 32 of magnetic material. In curve (b) of FIG. 8 the line 602 represents the information. It will be noted that for this embodiment the information is recorded on an analog basis and has both amplitude and frequency variations.

If the information were reproduced using the system illustrated in FIG. 1, the thin film 32 would have a reversal of magnetization at relatively few positions on the film. These few changes are not sufficient to accurately reproduce the information. A biasing original abeling reproduce the information. A biasing signal 604 is superimposed on the information signal in order to accurately reproduce the information 602. It will be noted that the biasing signal in combination with the information signal 602 produces many positions where the thin film is switched from one state to another. The biasing signal 604 therefore operates as a sampling signal to produce many points of switching of the information. Since it is desired to have as close a representation of the information as possible, the biasing signal should have a frequency higher than the highest frequency included within the information signal 602. Preferably, the biasing signal should be at least twice as high as the highest frequency of the information.

In FIG. 8(c) the square wave 606 illustrates the response of the reproducing system to the biasing signal. The biasing signal switches the thin film from one magnetic state to another at adjacent positions on the film. The time period for a complete cycle is represented by the sum of the half cycles shown as A and B, and if no information were present these periods would be equal. However, due to the presence of the information signal 602 the switching occurs at different times dependent upon the combination of the information 602 and the biasing signal 604. This change in timing is shown by the square wave 608 wherein the half period A has a larger duration than the half period B. The square wave 608 is then integrated to produce an output signal representative of the value of the information at a particular point.

The use of the biasing signal having a large frequency would be normally associated with a reproducing system as shown in FIG. 6 wherein the image scanner 46 is of an instantaneous type of transducer, for example, an image dissector. In this type of transducer there is no storage of information on the face of the image scanner and, therefore, the biasing signal must have a high frequency so that at each point the information is switched by the biasing signal.

A biasing signal may also be used when the image scanner 46 has a storage characteristic. For example, a vidicon-type of image scanner has storage characteristics. This type of scanner has advantages over the image dissector since the information is automatically integrated by the scanner itself. Also, this type of image scanner only requires a low frequency biasing signal. The biasing signal frequency must only be some multiple of the rate at which the information is presented to the scanner. For example, if the information is recorded in a series of frames, the biasing frequency need only be a small multiple of the frame rate.

In curve (a) of FIG. 9 the hysteresis loop characteristic of the various points on the thin film 32 is shown at 700. The information signal is illustrated in FIG. 9(b) as curve 702. The biasing signal as shown by the line 704 has a relatively slow frequency value. For example, as explained above, it may have a value of a small multiple of the frame rate. For purposes of further illustration, the biasing signal is assumed to be three times the frame rate.

Curve (c) of FIG. 9 is used in explaining the operation of the biasing signal shown in curve (b) of FIG. 9. Point 706 along the information curve 702 is used as representative of any point on the information curve. Curve 800 in FIG. 9(c) illustrates the charge characteristic of a point on the vidicon tube when supplied by the bias signal alone. It will be noted that the point on the vidicon charges up as shown at 802 for positive values of bias signal and then discharges as shown at 804 for negative values of bias signal.

The curve 800 resembles an integrated square wave and over each complete cycle has a net value of zero. The curve 806 illustrates the change of the charge characteristic with the application of the information signal. The point on the vidicon charges for a longer period of time due to the positive information signal as shown at point 706 on curve 702. This is shown at 808. The combination of the bias signal and the information produces a discharge for a short period of time as shown at 810.

Since the bias frequency is three times the frame rate, the point on the vidicon charges and discharges three times to produce a net charge at 812 on curve 806. This charge 812 approximates the signal 706 on curve 702. This type of biasing is similar to that shown in FIG. 8 in that the biasing basically produces a pulse width modulation. In the biasing of FIG. 8, the output signal from the detector must be integrated to produce a replica of the information signal. In the biasing of FIG. 9, the output signal is automatically integrated by the vidicon tube to directly reproduce the information signal.

It will be appreciated that the types of biasing signals shown in FIGS. 8 and 9 and referred to as 604 and 704 may be used with other types of information, for example, digital information, as shown in curve 3 of FIG. 3a. Also, biasing signals, as illustrated in FIGS. 8 and 9, may be used with information having a low level as long as the combination of the information and biasing signal is sufficient to switch the thin film.

It will be appreciated that the invention has been illustrated with reference to particular embodiments and that other modifications and adaptions may be made without departing from the concepts of this invention, and, therefore, the invention is only to be limited by the appended claims.

What is claimed is:

1. In combination in a system for reproducing phase modulated digital information recorded on a medium with the information recorded in a plurality of adjacent tracks at a selected area on the medium,
    a member having a thin film of magnetizable material disposed adjacent to the medium with the thin film in register with the selected area to obtain a direct transfer of the magnetic information from the area on the medium to a corresponding area on the thin film,
    first means disposed relative to the thin film for directing light toward the area on the thin film at an angle relative to the thin film to obtain a passage of light from the thin film and with the passage of light from the thin film having characteristics at various points along the adjacent tracks dependent upon the transfer of the magnetic information to the thin film,
    second means disposed relative to the thin film and responsive to the light passing from the film for succesively scanning such light along the adjacent tracks to detect the characteristics of the light at the various points to produce an output signal having characteristics in accordance with the information recorded along the tracks on the medium, and
    third means operatively coupled to the second means and responsive to the output signal to inhibit the passage of the output signal until the appearance of the information at the start of each adjacent track.

2. In combination in a system for reproducing phase modulated digital information recorded on a medium with the information recorded in a plurality of adjacent tracks at a selected area on the medium,
    a member having a thin film of magnetizable material disposed adjacent to the medium with the thin film in register with the selected area to obtain a direct transfer of the magnetic information from the area on the medium to a corresponding area on the thin film,
    first means disposed relative to the thin film for directing light toward the area on the thin film at an angle relative to the thin film to obtain a passage of light from the thin film and with the passage of light from the thin film having characteristics at various points along the adjacent tracks dependent upon the transfer of the magnetic information to the thin film,
    second means disposed relative to the thin film and having a first surface for intercepting and displaying the light passing from the thin film and with the second means including an electronic beam for successively scanning the first surface along the adjacent tracks to detect the characteristics of the light at the various points in representation of the magnetic information recorded along the tracks on the medium,
    third means operatively coupled to the second means for producing an output signal having characteristics in accordance with the characteristics of the light at the various points along the adjacent tracks, and
    fourth means operatively coupled to the third means for inhibiting the passage of the output signal until the electron beam detects the information at the start of each adjacent track.

3. In combination in a system for reproducing phase modulated digital information recorded on a medium with the information recorded at a plurality of successive areas on a medium with each area containing the information as a series of adjacent tracks,
    a member having a thin film of magnetizable material disposed adjacent to the medium with the thin film in register with the medium to obtain a direct transfer of the magnetic information to an area on the thin film during the presentation of the successive areas on the medium,
    first means operatively coupled to the medium for moving the medium in a particular direction to obtain the transfer of the magnetic information at the successive areas on the medium to the thin film at progressive periods of time,
    second means disposed relative to the thin film for directing light toward the area on the thin film at an angle relative to the thin film to obtain a passage of light from the thin film and with the passage of light from the thin film having characteristics at various points along the adjacent tracks dependent upon the transfer of the magnetic information to the thin film,
    third means disposed relative to the thin film and responsive to the light passing from the thin film for successively scanning the adjacent tracks to detect the characteristics of the light at the various points and to produce an output signal having characteristics in accordance with the information recorded at the successive areas on the medium, and
    fourth means operatively coupled to the third means and responsive to the output signal to inhibit the passage of the output signal until the appearance of the information at the start of each adjacent track.

4. In combination, a system for reproducing information recorded on a medium with the information recorded in a plurality of adjacent tracks at a selected area on the medium and with the information contained on the medium as a phase reversal in the recorded signal at a plurality of points along each track,
    a member having a thin film of magnetizable material disposed adjacent to the medium with the thin film in register with the selected area to obtain a direct transfer of the magnetic information from the area on the medium to a corresponding area on the thin film,
    first means disposed relative to the thin film for directing light toward the area on the thin film at an angle relative to the thin film to obtain a passage of light from the thin film and with the passage of light from the thin film having characteristics at the various points along the adjacent tracks dependent upon the transfer of the magnetic information to the thin film,
    second means disposed relative to the thin film and responsive to the light passing from the thin film for successively scanning the adjacent tracks to obtain an output signal having phase changes in accordance with the information at the various points along the tracks on the medium, third means operatively coupled to the second means and responsive to the appearance of phase changes in the recorded information at the beginning of each track to produce output signals in accordance with such phase changes, and fourth means responsive to the signals produced by the third means for inhibiting the passage of the output signal until the appearance of a first phase change in the information signal in each track.

5. In combination in a system for reproducing magnetic information recorded along a track on a magnetic medium where the track is defined by a pair of boundaries and a center intermediate the boundaries, first means disposed relative to the medium and having magnetic-optical properties for detecting the magnetic information recorded on the medium, second means for providing a signal at a particular frequency, third means operatively coupled to the first means and responsive to the signal from the second means for detecting the information recorded on the track at the particular frequency in an oscillating path around the center of the track and between the boundaries of the track, fourth means operatively coupled to the third means and responsive to the variations in the oscillation of the detecting means around the center of the track to produce an output signal in accordance with such variations, and fifth means operatively coupled to the third means and responsive to the output signal produced by the third means and to the signal from the second means for regulating the operation of the third means in accordance with any differences in the signals from the second means and from the output means to control the detection by the third means along a path around the center of the track.

6. In combination, a system for reproducing phase modulated digital information recorded on a medium with the information recorded in a plurality of adjacent tracks at a selected area on the medium, a member having a thin film of magnetizable material disposed adjacent to the medium with the thin film in register with the selected area to obtain a direct transfer of the magnetic information from the area on the medium to a corresponding area on the thin film, first means disposed relative to the thin film for directing light toward the area on the thin film at an angle relative to the thin film to obtain a passage of light from the thin film and with the passage of light from the thin film having characteristics at various points along the adjacent tracks dependent upon the transfer of the magnetic information to the thin film, second means disposed relative to the thin film and responsive to the light passing from the thin film for directing a beam toward the reflected area to successively scan the adjacent tracks to detect the characteristics of the light at the various points in representation of the magnetic information recorded along the tracks on the medium, third means operatively coupled to the second means and responsive to variations in the position of the beam and the tracks on the thin film during the scanning of the thin film to produce a control signal having characteristics in accordance with such variations, and fourth means operatively coupled to the second means and responsive to the control signal for regulating the direction of the beam toward the thin film to control the scanning of the beam along the adjacent tracks on the thin film.

7. The combination of claim 6 wherein the track is defined by a pair of boundaries and a center between the boundaries and the third means for producing the control signal includes means for oscillating the scanning beam around the center of the track and with the characteristics of the control signal dependent upon variations in the oscillation of the beam around the center of the track.

8. In combination with a system for reproducing information recorded on a medium, first means disposed relative to the medium for superimposing a biasing signal on the information located on the medium to produce an output signal from the medium with pulse width modulated characteristics in accordance with the combination of the biasing signal and the information signal, second means disposed relative to the medium for detecting the pulse width modulated signal produced by the superimposition of the biasing signal on the information signal, and third means operatively coupled to the second means for producing from the pulse width modulated signal an output signal having characteristics in accordance with the information signal.

9. The combination of claim 8 wherein the third means produces the output signal by integrating the pulse width modulated signal.

10. In combination in a system for reproducing information recorded on a medium with the information recorded in a plurality of adjacent tracks at a selected area on the medium, a member having a thin film of magnetizable material disposed adjacent to the medium with the thin film in register with the selected area to obtain a direct transfer of the magnetic information from the area on the medium to a corresponding area on the thin film, first means for producing a biasing signal, second means operatively coupled to the first means for superimposing the biasing signal on the magnetic information during the transfer of the information from the medium to the thin film, third means disposed relative to the thin film for directing light toward the area on the thin film at an angle relative to the thin film to obtain a passage of light from the thin film and with such light from the thin film having characteristics at various points along the adjacent tracks dependent upon the biasing signal and upon the transfer of the magnetic information to the thin film, and fourth means disposed relative to the thin film and responsive to the light passing from the thin film for successively scanning the thin film to detect the characteristics of the light at the various points in representation of the magnetic information recorded along the tracks on the medium.

11. The combination as in claim 10 wherein the frequency of the biasing signal is higher than the largest frequency included within the information.

12. The combination of claim 10 wherein the information is recorded on a medium at successive areas and the medium is moved relative to the thin film to present the successive areas at successive periods of time to the thin film and wherein the frequency of the biasing signal is a multiple of the frequency at which the successive areas are presented to the thin film.

13. The combination of claim 11 wherein the biasing signal is superimposed on the information by a coil surrounding the medium.

14. The combination of claim 11 wherein the biasing signal is superimposed on the information by a conductor located adjacent to and insulated from the thin film.

15. In combination in a system for reproducing information recorded along a track on a magnetic medium, a member having a thin film of magnetizable material disposed adjacent to the medium with the thin film in register with the medium to obtain a direct transfer of the magnetic information from the medium to the thin film, first means for providing a movement of the medium in a particular direction relative to the thin film for presenting the magnetic information along the track to the thin film, second means for providing a biasing signal, third means operatively coupled to the second means for superimposing the biasing signal on the magnetic information during the transfer of the information from the medium to the thin film, fourth means disposed relative to the thin film for directing light toward the thin film at an angle relative to the thin film to obtain a passage of light from the thin film and with the passage of light from the thin film having characteristics dependent upon the biasing signal and the transfer of the magnetic information to the thin film, and means disposed relative to the thin film and responsive to the reflected light to detect the characteristics of the light to produce an output signal having characteristics in accordance with the characteristics of the magnetic information.

16. The combination of claim 15 wherein the frequency of the biasing signal is higher than the highest frequency included within the magnetic information.

17. The combination of claim 15 wherein the frequency of the biasing signal is greater than the rate at which the medium is moved relative to the thin film.

18. The combination of claim 15 wherein the biasing signal is superimposed on the information by passing the medium through a toroidal coil having the biasing signal coupled to the coil.

19. The combination of claim 15 wherein the biasing signal is superimposed on the information by a conductor located adjacent to and insulated from the thin film.

20. In combination in a system for reproducing information recorded on a medium with the information recorded in a plurality of adjacent tracks at a selected area on the medium, a member having a thin film of magnetizable material disposed adjacent to the medium with the thin film in register with the selected area to obtain a direct transfer of the magnetic information from the area on the medium to the thin film, first means disposed relative to the medium and the thin film for superimposing a biasing signal on the information transferred from the medium to the thin film to provide for the information being transferred to the thin film pulse-width-modulated characteristics in accordance with the combination of the biasing signal and the information being transferred.

third means disposed relative to the thin film for directing light toward the thin film at an angle relative to the thin film to obtain a passage of light from the thin film and with such light from the thin film having, at various points along the adjacent tracks, characteristics dependent upon the pulse-width characteristics of the information transferred to the thin film, fourth means disposed relative to the thin film and responsive to the light passing from the thin film for detecting the characteristics of the light at the various positions in representation of the magnetic information recorded on the medium, and fifth means operatively coupled to the fourth means for producing from the pulse-width-modulated signal an output signal having characteristics in accordance with the detected light.

21. The combination set forth in claim 20 wherein the fifth means includes an integrator.

22. In combination in a system for reproducing magnetic information recorded in successive tracks on a medium where each of the successive tracks is defined by a pair of boundaries and a center intermediate the boundaries, first means disposed relative to the medium and having magneto-optical properties for detecting the magnetic information recorded on the medium, second means operatively coupled to the first means for obtaining a scanning of each successive track on the medium by the first means, third means operatively coupled to the second means for controlling at each instant the operation of the second means at a position between the pair of boundaries for the track being scanned, fourth means for providing a signal at a particular frequency, fifth means operatively coupled to the third and fourth means for introducing the signal at the particular frequency from the fourth means to the third means to produce an amplitude modulation of the detected signals at the particular frequency in accordance with the position of the second means between the pair of boundaries defining the track being scanned, sixth means operatively coupled to the first and fourth means for comparing at each instant the amplitudes of the signals at the particular frequency from the fourth means and the amplitude of the detected signal from the first means to produce an error signal in accordance with the differences in such amplitudes, and seventh means operatively coupled to the sixth means and responsive to the error signal for regulating the operation of the third means in accordance with the characteristics of the error signal to control the scan of the track along the center position.

23. In the combination set forth in claim 22, the sixth means constituting a balanced modulator and the first means includes an integrator.

24. In combination in a system for reproducing magnetic information recorded in successive tracks on a medium where each of the successive tracks is defined by a pair of boundaries and a center intermediate the boundaries, a member having a thin film of magnetizable material disposed adjacent to the medium with the thin film in register with the medium to obtain a direct transfer of the magnetic information on the medium to the thin film, second means disposed relative to the thin film for directing light toward the thin film at an angle relative to the thin film to obtain a passage of light from the thin film with characteristics at successive positions along each track in accordance with the characteristics of the information transferred to the thin film from the medium, third means disposed relative to the thin film and having magneto-optical properties for detecting the light passing from the thin film, fourth means operatively coupled to the second means for obtaining a scanning of each successive track on the thin film by the second means, fifth means operatively coupled to the third means for controlling at each instant the operation of the fourth means at a position between the pair of boundaries for the track being scanned, sixth means for providing a signal at a particular frequency, seventh means operatively coupled to the fifth and sixth means for introducing the signal at the particular frequency from the sixth means to the fifth means to produce an amplitude modulation of the detected signals at the particular frequency in accordance with the position of the fourth means between the pair of boundaries defining the track being scanned, eighth means operatively coupled to the third and sixth means for comparing at each instant the characteristics of the signals at the particular frequency from the sixth means and of the detected signal from the third means to produce an error signal in accordance with the differences in such characteristics, and ninth means operatively coupled to the eighth means and responsive to the error signal for regulating the operation of the fifth means in accordance with the characteristics of the error signal to control the scan of the track along the center position.

25. In the combination set forth in claim 24, ninth means disposed relative to the medium and the thin film for superimposing a biasing signal on the information transferred from the medium to the thin film to provide for the information being transferred to the thin film pulse-width-modulated characteristics in accordance with the combination of the biasing signal and the information being transferred.

26. The combination set forth in claim 25 wherein the eighth means constitutes a balanced modulator and the third means includes an integrator and a bandpass filter.

References Cited
UNITED STATES PATENTS

| | | | |
|---|---|---|---|
| 2,714,048 | 7/1955 | Baird | 179—100.2 |
| 2,743,648 | 5/1956 | Parker | 178—7.2 |
| 2,756,276 | 7/1956 | Gratian et al. | 179—100.2 |
| 2,890,288 | 6/1959 | Newman | 179—100.2 |
| 3,032,612 | 5/1962 | Goldmark | 179—100.2 |
| 2,984,825 | 5/1961 | Fuller et al. | 340—174.1 |
| 3,059,538 | 10/1962 | Sherwood et al. | 340—174.1 |

OTHER REFERENCES

IBM Technical Disclosure Bulletin, February 1959, vol. 1.

IBM Technical Disclosure Bulletin, August 1960, vol. 3.

"High Speed Magnetooptical Measurements of Films," Archibold et al., Review of Scientific Instruments, vol. 31—No. 6, June 1960.

TERRELL W. FEARS, Primary Examiner

U.S. Cl. X.R.

178—7.2; 179—100.2